United States Patent
Jang et al.

(10) Patent No.: US 10,356,134 B2
(45) Date of Patent: Jul. 16, 2019

(54) METHOD AND SYSTEM FOR DOWNLOADING RESOURCE IN MOBILE ENVIRONMENT

(71) Applicant: NHN Entertainment Corporation, Seongnam-si (KR)

(72) Inventors: Kyoung Ryeol Jang, Seongnam-si (KR); KiHuen Lee, Seongnam-si (KR); Dong Soo Lee, Seongnam-si (KR); Tae Gyeong Kim, Seongnam-si (KR); WooJin Cho, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 0 days.

(21) Appl. No.: 15/235,681

(22) Filed: Aug. 12, 2016

(65) Prior Publication Data
US 2018/0048686 A1    Feb. 15, 2018

(30) Foreign Application Priority Data
Aug. 12, 2015    (KR) .................. 10-2015-0113695

(51) Int. Cl.
| H04M 1/725 | (2006.01) |
| H04M 3/42 | (2006.01) |
| H04W 4/00 | (2018.01) |
| H04L 29/06 | (2006.01) |

(Continued)

(52) U.S. Cl.
CPC .......... *H04L 65/4015* (2013.01); *H04L 67/34* (2013.01); *H04L 69/14* (2013.01); *H04M 1/72522* (2013.01); *H04M 3/42178* (2013.01); *H04W 4/60* (2018.02)

(58) Field of Classification Search
CPC ............ G06F 17/3028; G06F 13/1605; G06F 9/5016; G06F 9/5027; H04L 67/02; H04L 67/06; H04L 65/60; H04L 67/1095; H04L 67/32; H04L 65/40; H04W 88/06; H04W 8/183; H04W 28/16; H04W 4/18
See application file for complete search history.

(56) References Cited

U.S. PATENT DOCUMENTS

| 2006/0179153 A1* | 8/2006 | Lee .................. H04L 67/32 709/231 |
| 2009/0013034 A1* | 1/2009 | Cheng ................ H04L 67/02 709/203 |

(Continued)

FOREIGN PATENT DOCUMENTS

| KR | 10-2007-0000867 | 1/2007 |
| KR | 10-2012-0140670 | 12/2012 |
| KR | 10-2013-0116166 | 10/2013 |

*Primary Examiner* — George Eng
*Assistant Examiner* — Umair Ahsan
(74) *Attorney, Agent, or Firm* — H.C. Park & Associates, PLC

(57) ABSTRACT

A method of downloading a resource in a mobile environment includes detecting an attempt to access at least one server from a mobile terminal, executing a thread for each server to which the attempt to access is made, based on a multi-thread, downloading a resource of the at least one server through the corresponding thread, the resource being compressed based on a file unit, and unpacking the compressed resource, in which the threads are executed in parallel in the order of servers to which the attempt to access is made.

11 Claims, 6 Drawing Sheets

(51) Int. Cl.
  *H04W 4/60*   (2018.01)
  *H04L 29/08*  (2006.01)

(56) References Cited

U.S. PATENT DOCUMENTS

| | | | |
|---|---|---|---|
| 2011/0225302 A1* | 9/2011 | Park | H04L 65/4084 709/227 |
| 2011/0302586 A1 | 12/2011 | Chung | |
| 2015/0180937 A1* | 6/2015 | Makela | G06F 3/0481 715/736 |
| 2015/0358389 A1* | 12/2015 | Vytla | H04L 67/42 709/203 |

* cited by examiner

METHOD AND SYSTEM FOR DOWNLOADING RESOURCE IN MOBILE ENVIRONMENT

CROSS-REFERENCE TO RELATED APPLICATION

This application claims priority from and the benefit of Korean Patent Application No. 10-2015-0113695, filed on Aug. 12, 2015, which is hereby incorporated by reference for all purposes as if fully set forth herein.

BACKGROUND

Field

Exemplary embodiments relate to a system and a method for enhancing a download rate in a mobile environment.

Discussion of the Background

FIG. 1 is a diagram illustrating an operation of a resource download system according to the related art.

In general, a resource download system may download a resource through a single-thread 100 to achieve a fast download speed. For example, the resource download system may download a resource by accessing a server based on the single-thread 100. Once downloading of the resource is completed, the resource download system may record the downloaded resource in a storage device.

However, when downloading multiple resources based on a single-thread, the conventional resource download system may download a second resource when downloading the first resource is completed. Also, when a resource is downloaded based on the single-thread, the conventional resource download system may inefficiently use network resources due to a standby time used to access a server, a request response time after the access, a file recording time, and the like.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a resource download system and a method of providing an improved download scheme in a mobile environment based on a multi-thread.

Exemplary embodiments also provide a resource download system and a method of providing a scheme for enhancing a resource download rate at a mobile terminal, such that users may be retained.

Additional aspects will be set forth in the detailed description which follows, and, in part, will be apparent from the disclosure, or may be learned by practice of the inventive concept.

According to an exemplary embodiment of the present invention, a method of downloading a resource in a mobile environment includes detecting an attempt to access at least one server from a mobile terminal, executing a thread for each server to which the attempt to access is made, based on a multi-thread, downloading a resource of the at least one server through the corresponding thread, the resource being compressed based on a file unit, and unpacking the compressed resource, in which the threads are executed in parallel in the order of servers to which the attempt to access is made.

According to an exemplary embodiment of the present invention, a non-transitory computer-readable recording medium including computer-readable instructions to control a computer system to download a resource in a mobile environment, in which the computer-readable instructions control the computer system by a method including detecting an attempt to access at least one server from a mobile terminal, executing a thread for each server to which the attempt to access is made, based on a multi-thread, downloading a resource of the at least one server through the corresponding thread, the resource being compressed based on a filed unit and unpacking the compressed resource, in which the threads are executed in parallel in the order of servers to which the attempt to access is made.

According to an exemplary embodiment of the present invention, a system for downloading a resource in a mobile environment includes a detector configured to detect an attempt to access at least one server from a mobile terminal, an executor configured to execute a thread for each server to which the attempt to access is made, and a downloader configured to download a resource of the at least one server through the corresponding thread, and to unpack the resource that is compressed based on a file unit, in which the threads are executed in parallel in the order of servers to which the attempt to access is made.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

Figure 1:
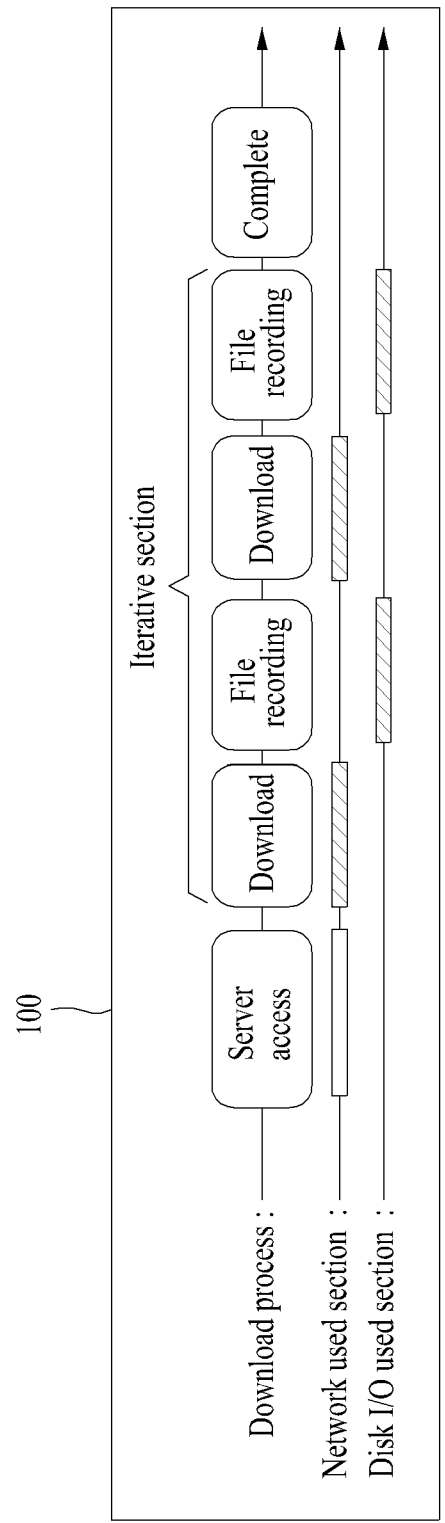
FIG. 1 is a diagram illustrating an operation of a resource download system according to the related art.

It should be noted that these figures are intended to illustrate the general characteristics of methods and/or structure utilized in certain exemplary embodiments and to supplement the written description provided below. These drawings are not, however, to scale and may not precisely reflect the precise structural or performance characteristics of any given embodiment, and should not be interpreted as defining or limiting the range of values or properties encompassed by exemplary embodiments.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of elelayers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Exemplary embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more exemplary embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more exemplary embodiments, computer processing devices may be described as including various functional units that perform various operations and/or functions to increase the clarity of the description. However, computer processing devices are not intended to be limited to these functional units. For example, in one or more exemplary embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more exemplary embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the exemplary embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the exemplary embodiments, or they may be known devices that are altered and/or modified for the purposes of exemplary embodiments.

A hardware device, such as a computer processing device, may run an operating system (OS) and one or more software applications that run on the OS. The computer processing device also may access, store, manipulate, process, and create data in response to execution of the software. For simplicity, one or more exemplary embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of exemplary embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, exemplary embodiments will be described with reference to the accompanying drawings.

According to exemplary embodiments of the present invention, a resource download system may provide a scheme of enhancing a resource download rate at a mobile terminal, such that a user may be retained. The resource download system may download a resource based on a multi-thread. The term "thread" used herein refers to an execution path present in a process when executing a computer program or an application, and may execute multiple actions at a time or sequentially. The resource download system may execute a plurality of threads based on a multi-thread.

Figure 2:
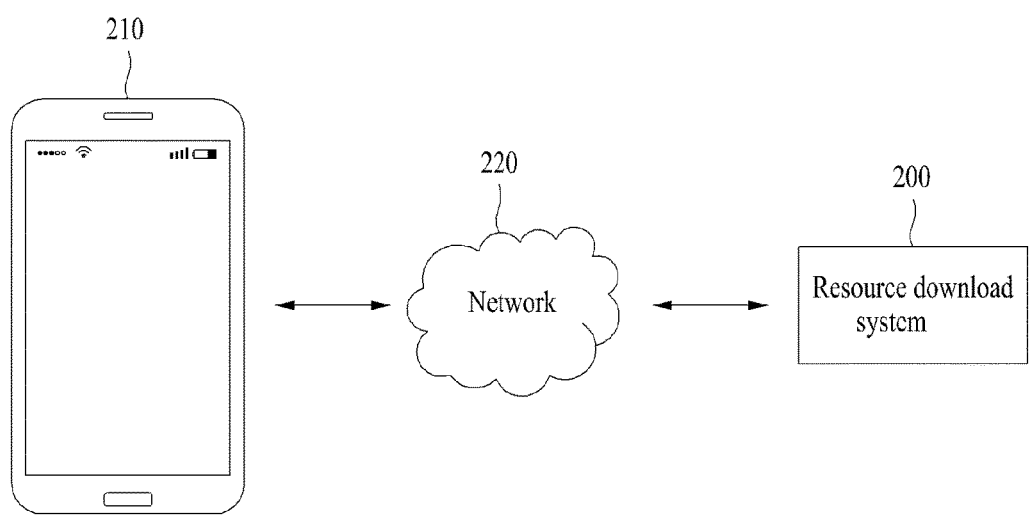
FIG. 2 is a diagram illustrating an operation of a resource download system according to an exemplary embodiment of the present invention.

FIG. 2 is a diagram illustrating an operation of a resource download system according to an exemplary embodiment of the present invention.

Referring to FIG. 2, a resource download system 200 and a mobile terminal 210 may transmit and receive data via a network 220. The network 220 may include a more number or a lesser number of components, connections, and interactions than those illustrated in FIG. 2.

The network 220 may be a medium that may provide communication links between data processing systems, computers, servers, and/or a variety of devices. The network 220 may be a world wide collection of gateways and networks that use transmission control protocol/Internet protocol (TCP/IP) suite of protocols. For example, the network 220 may include an intranet, a local area network (LAN), and/or a wide area network (WAN), etc., or a portion thereof. As another example, the network 220 may be a portion of the Internet.

The mobile terminal 210 may be a portable device, such as a smartphone, a tablet, a wearable computer, and the like. The mobile terminal 210 may be any type of terminal devices capable of providing a connection to a mobile site associated with the resource download system 200 and/or installing and executing a service exclusive application. Here, the mobile terminal 210 may perform an overall service operation, such as a service screen configuration, a data input, a data transmission/reception, a data storage, and the like, under control of the mobile site or the exclusive application.

The resource download system 200 may be configured as a download platform that provides a download service, and may provide an environment for performing downloading of a resource to a client using the download service, such as the mobile terminal 210.

The resource download system 200 may be included in a platform of a download server (not shown) that provides a download service. The resource download system may alternatively be a separate system from the download server, and download a resource in interaction with the download server.

At least a portion of constituent components of the resource download system 200 may be configured as a form of an application that is installed on the mobile terminal 210, or included in a platform that provides a service in a client-server environment.

Figure 3:
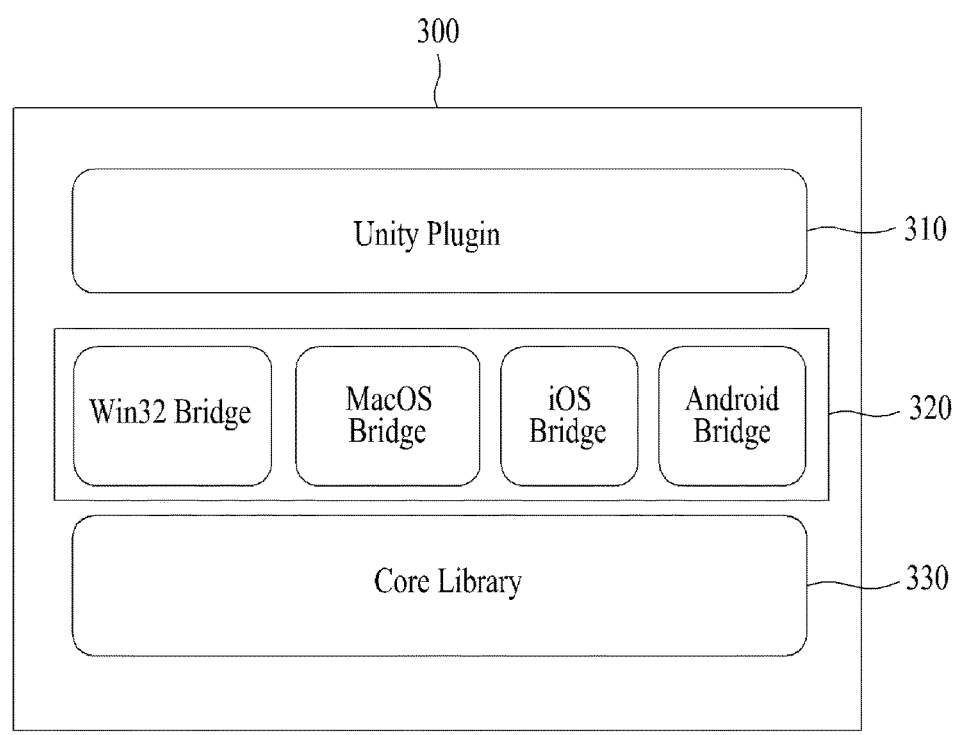
FIG. 3 is a diagram illustrating a configuration of a resource download system according to an exemplary embodiment of the present invention.

FIG. 3 is a diagram illustrating a configuration of a resource download system according to an exemplary embodiment of the present invention.

Referring to FIG. 3, the resource download system 300 may include modules, for example, a unity plugin 310, a platform bridge 320, and a core library 330.

The unity plugin 310 may be a plugin for unity development and may be connected through a bridge module.

The platform bridge 320 may be a bridge module for providing a connection to each platform, and may be written with a language suitable for each platform. The platform bridge 320 may include, for example, Win32 Bridge, MacOs Bridge, iOS Bridge, and Android Bridge. The platform bridge 320 may write Win32 with C++, Mac and iOS with Objective C, and Android with Java or Jni.

The core library 330 may be a library written with C++, and may manage http connection. The core library 330 may perform file packing and unpacking. The core library 330 may be, for example, HUL download core module. The resource download system according to the present exemplary embodiment may be applicable in a mobile terminal without being limited to a platform.

Figure 4:
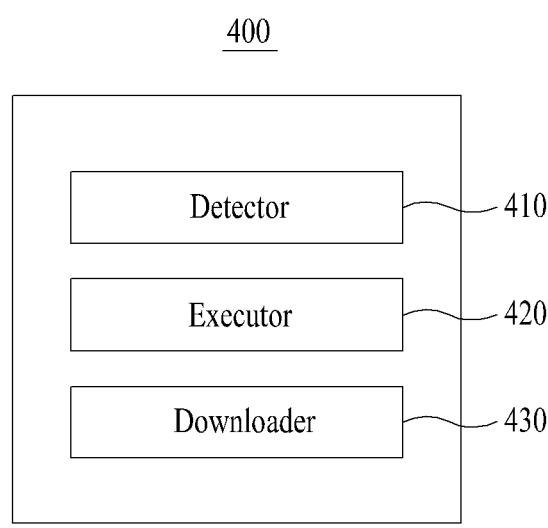
FIG. 4 is a block diagram illustrating a configuration of a resource download system according to an exemplary embodiment of the present invention.

FIG. 4 is a block diagram illustrating a configuration of a resource download system according to an exemplary embodiment of the present invention.

Referring to FIG. 4, a resource download system 400 may download a resource based on each thread by executing the respective threads in parallel in the order of servers to which an attempt to access is made from a mobile environment. The resource download system 400 may include a detector 410, an executor 420, and a downloader 430.

The detector 410 may detect an attempt to access at least one server from a mobile terminal. The detector 410 may detect an access from the mobile terminal to another server while downloading a resource corresponding to a server based on a thread.

The executor 420 may execute the respective threads based on a multi-thread in response to the attempt to access the server.

The downloader 430 may download a resource in a server based on each thread, and may unpack a resource that is compressed based on a file unit. The downloader 430 may receive the compressed resource, in response to a request to the server for the resource based on each thread, and may download the compressed resource.

The downloader 430 may unpack the resource and record the unpacked resource in a storage device, in response to completing downloading of the compressed resource. The downloader 430 may download resources executed in the respective threads at different rates, such that a thread completed with the download is preferentially entered into an idle state.

Figure 5:
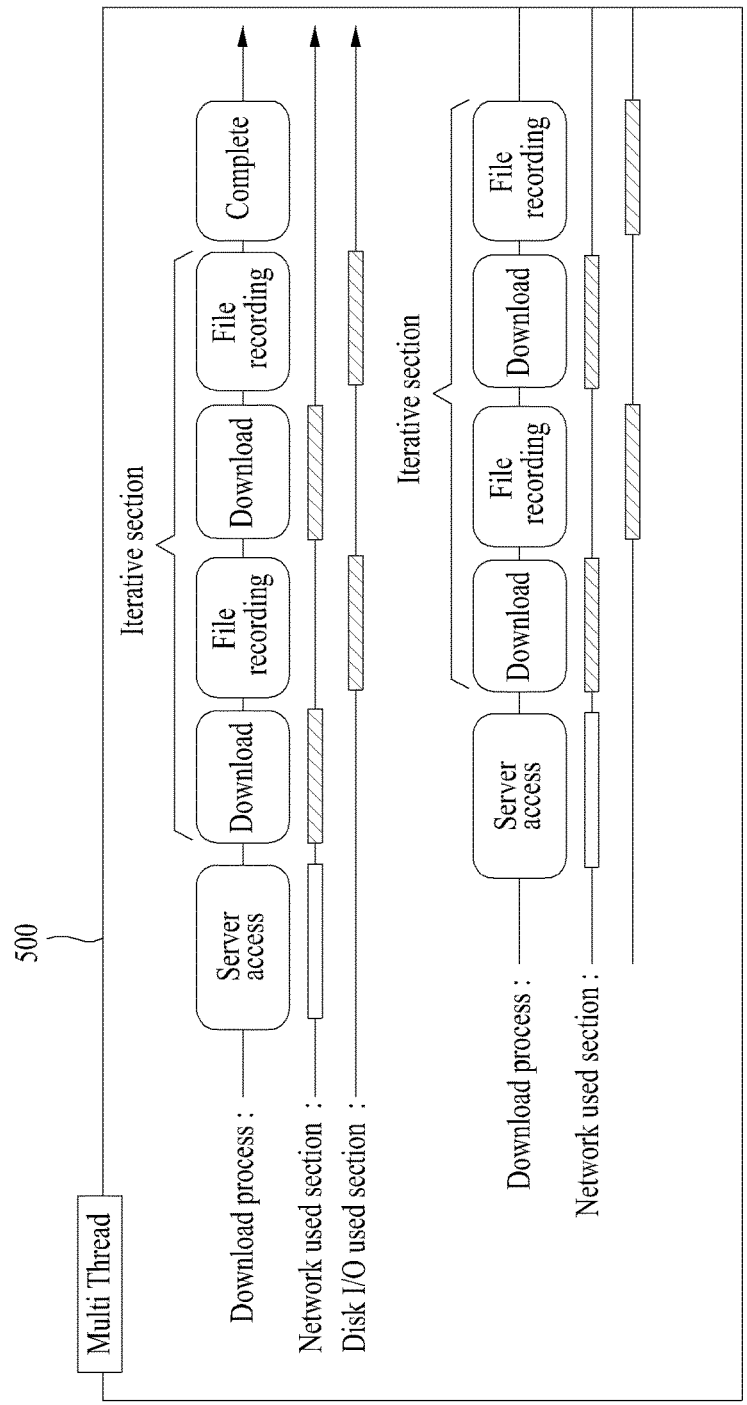
FIG. 5 is a diagram illustrating an operation of a resource download system according to an exemplary embodiment of the present invention.

FIG. 5 is a diagram illustrating an operation of a resource download system according to an exemplary embodiment of the present invention.

Referring to FIG. 5, the resource download system may execute the respective threads in parallel in the order of servers to which an attempt to access is made, based on a multi-thread 500 in a mobile environment. The resource download system may download a resource associated with a corresponding server based on each thread. The resource download system may download the respective resources without a standby time by distributing resources of a network based on the multi-thread 500.

The resource download system may detect an attempt to access at least one server from a mobile terminal. For example, a user may attempt to download a first application using a mobile terminal. The resource download system may detect the attempt to access a first server from the mobile terminal, and execute a first thread based on a multi-thread in response to the attempt to access the first server.

The resource download system may initiate downloading of a resource corresponding to the first server based on the first thread. The resource download system may receive and download a resource that is compressed based on a file unit in response to a request to the first server for the resource. The resource download system may receive the resource that corresponds to the first server, which is compressed based on the file unit. The resource download system may unpack the compressed resource. Upon completing the downloading of the compressed resource, the resource download system may unpack the resource and record the unpacked resource in a storage device. This process may be repeated.

The resource download system may also detect an attempt to access another server from the mobile terminal at the same time during downloading the resource corresponding to the first server. For example, the user may attempt to download a second application while the first application is being downloaded through the mobile terminal. In this case, the resource download system may detect the attempt to access a second server from the mobile terminal.

In response to the attempt to access the second server, the resource download system may execute a second thread based on a multi-thread. The resource download system may execute the first and second threads in parallel in the order of serves to which an attempt to access is made, and may download a resource associated with a corresponding server based on each thread.

The resource download system may initiate downloading of a resource corresponding to the second server based on the second thread. The resource download system may receive and download a resource that is compressed based on a file unit, in response to a request to the second server for the resource based on the second thread. The resource download system may receive the resource that corresponds to the second server, which is compressed based on the file unit. The resource download system may unpack the compressed resource. In response to completing downloading of the resource that is compressed based on the file unit, the resource download system may unpack the resource and may record the unpacked resource in the storage device.

According to an exemplary embodiment of the present invention, the resource download system may reduce (or, alternatively, minimize) the amount of time used for downloading by downloading a resource that is compressed based on a file unit.

The resource download system may download the respective resources executed in the respective threads at different rates, such that a thread completed with the download is preferentially entered into an idle state.

Likewise, the resource download system may detect an attempt to access another server from the mobile terminal at the same time of downloading a resource corresponding to the second server. Here, the resource download system may execute and operate multiple threads based on a multi-thread without being limited to the number of threads. Also, the resource download system may perform automatic scheduling in an operating system (OS) of the mobile terminal.

Figure 6:
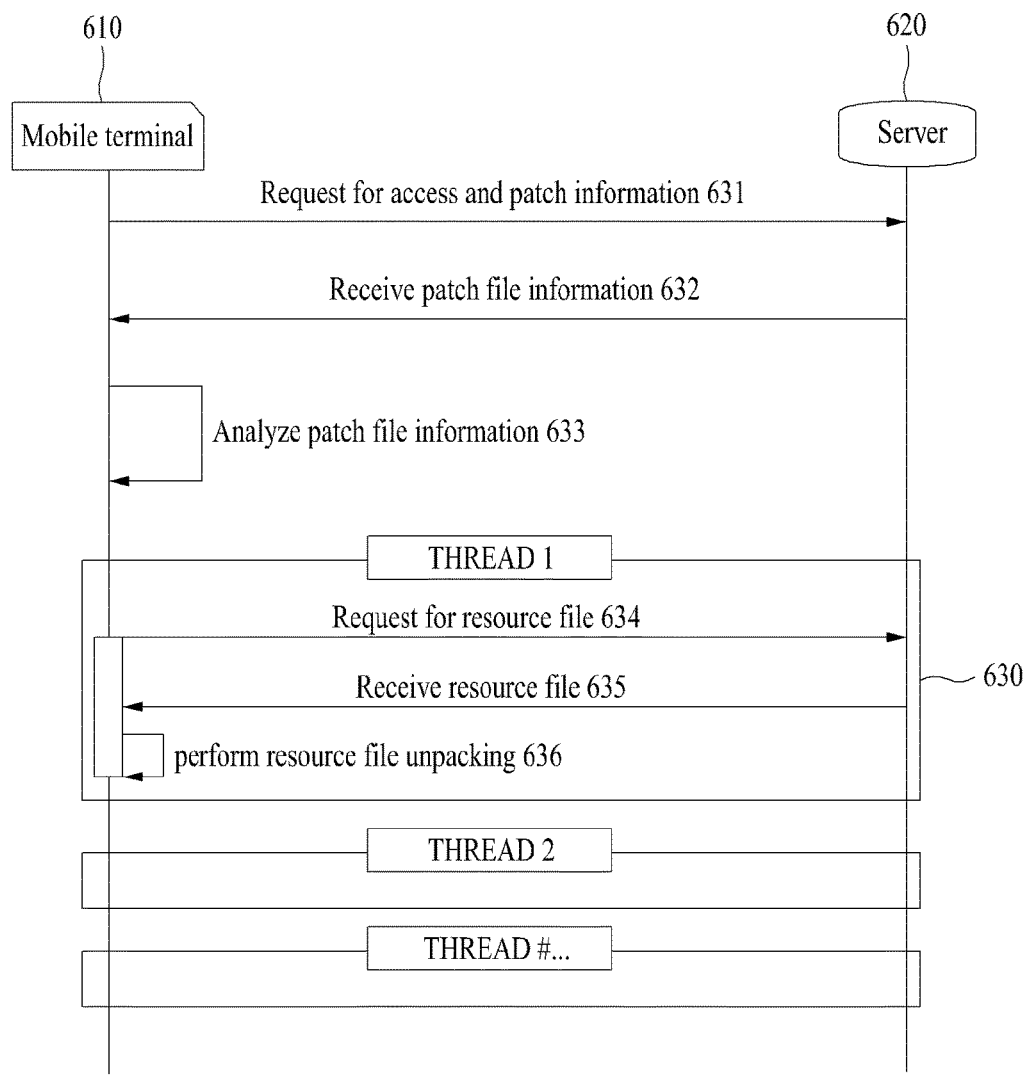
FIG. 6 is a flowchart illustrating a resource download method performed at a resource download system according to an exemplary embodiment of the present invention.

FIG. 6 is a flowchart illustrating a resource download method performed at a resource download system according to an exemplary embodiment of the present invention.

The resource download method may be performed at the resource download system. The resource download system may download the respective resources without a standby time by distributing resources of a network based on a multi-thread in a mobile environment.

For example, a user may download an application through a mobile terminal 610. The resource download system may detect an attempt to access at least one server 620 from the mobile terminal 610. For example, the resource download system may download an application through an Internet data center (IDC).

The mobile terminal 610 may request the server 620 for an access and patch information in order to download the application in operation 631. The mobile terminal 610 may receive patch file information from the server 620 in operation 632. In operation 633, the mobile terminal 610 may analyze the received patch file information.

The mobile terminal 610 may execute each thread based on a multi-thread in response to the attempt to access the server 620. For example, the mobile terminal 610 may access the server 620 to download the application, and the mobile terminal 610 may execute a first thread (THREAD 1) in operation 630. Here, since the mobile terminal 610 controls a thread in an operation system (OS), the thread may be automatically scheduled.

The mobile terminal 610 may request the server 620 for the resource based on the first thread 630 in operation 634, and may receive the resource that is compressed based on a file unit from the server 620 in operation 635. In operation 636, the mobile terminal 610 may download the resource that is compressed based on the file unit. Here, the mobile terminal 610 may reduce (or, alternatively, minimize) the amount of time for the download by downloading the compressed resource. Upon completion of downloading of the compressed resource, the mobile terminal 610 may unpack the resource and record the unpacked resource in a storage device.

While downloading the application, the mobile terminal 610 may attempt to download another application from another server. In response to the attempt to access the server 620, the mobile terminal 610 may execute the respective threads based on the multi-thread. For example, the mobile terminal 610 may access the server 620 to download an application, and may execute the second thread (THREAD 2). The resource download system may execute the respective threads in parallel in the order of servers to which an attempt to access is made, and may download a resource associated with a corresponding server based on the multi-thread.

Since resources executed in the respective threads are downloaded at different rates, the resource download system may control the threads such that a thread completed with the download is preferentially entered into an idle state.

The resource download system according to exemplary embodiments of the present invention may provide an improved download scheme for a mobile terminal by using a multi-thread. That is, the resource download system may achieve a further greater effect with the development of hardware in a mobile terminal.

The resource download system according to exemplary embodiments may reduce the size of a resource to be downloaded by automatically compressing and uploading the resource based on a file unit, based on a multi-thread in a mobile environment. In addition, the resource download system may improve a downloading speed by downloading and then unpacking the resource that is compressed based on the file unit. To this end, the resource download system may further include an uploader (not shown) configured to compress the resource based on the file unit and upload the compressed resource to a corresponding server. For example, a mobile terminal installed with the resource download system in an application form may compress a resource desired to upload to a server based on a file unit, and may upload the compressed resource to the server. The corresponding mobile terminal or other mobile terminals attempting to download the resource may receive the compressed resource and then acquire the original resource by unpacking the received compressed resource. In this manner, the amount of data to be downloaded may be reduced and a download rate may be improved based on the decreased amount of data to be downloaded.

The resource download system according to exemplary embodiments may reduce (or, alternatively, minimize) the amount of time for downloading a resource and provide a download scheme utilizing a multi-thread for a mobile environment, which provides an improved downloading scheme over the conventional single-thread based download system, and thereby improve user experience and retain users.

The resource download system according to exemplary embodiments may effectively use hardware of a mobile terminal using a multi-thread scheme. The resource download system may increase the effect by employing a download scheme for a latest mobile environment.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The exemplary embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A method of downloading a resource in a mobile environment, the method comprising:
   detecting a first attempt to access a first server from a mobile terminal;
   executing a first thread for the first server to which the first attempt to access is made;
   downloading a resource of the first server through the first thread;
   detecting a second attempt to access a second server from the mobile terminal while downloading the resource of the first server;
   executing a second thread for the second server, based on a multithread;
   downloading a resource of the second server to which the second attempt to access is made, each resource being compressed based on a file unit and being downloaded without a standby time by distributing resources of a network based on the multi-thread; and
   unpacking each of the compressed resources,
   wherein the first and second threads are executed in parallel in the order of servers to which the attempt to access is made, and
   wherein each of the first attempt and the second attempt is performed by a user of the mobile terminal at a time different from one another.

2. The method of claim 1, wherein unpacking the compressed resource comprises receiving the compressed resource in response to a request to the corresponding server for the resource based on the corresponding thread, and downloading the compressed resource.

3. The method of claim 2, wherein unpacking the compressed resource comprises unpacking the compressed source and recording the unpacked resource in a storage device upon completing the download of the compressed resource.

4. The method of claim 2, wherein unpacking the compressed resource comprises downloading resources executed in the respective threads at different rates such that a thread completed with the download is entered into an idle state.

5. The method of claim 1, further comprising:
   compressing the resource based on the file unit; and
   uploading the compressed resource to the corresponding server.

6. A non-transitory computer-readable recording medium comprising computer-readable instructions to control a computer system to download a resource in a mobile environment, wherein the computer-readable instructions control the computer system by a method comprising:
   detecting a first attempt to access a first server from a mobile terminal;
   executing a first thread for the first server to which the first attempt to access is made;
   downloading a resource of the first server through the first thread;
   detecting a second attempt to access a second server from the mobile terminal while downloading the resource of the first server;
   executing a second thread for the second server to which the second attempt to access is made, based on a multi-thread; and
   downloading a resource of the second server, each resource being compressed based on a file unit and being downloaded without a standby time by distributing resources of a network based on the multi-thread; and
   unpacking each of the compressed resources,
   wherein the first and second threads are executed in parallel in the order of servers to which the attempt to access is made, and
   wherein each of the first attempt and the second attempt is performed by a user of the mobile terminal at a time different from one another.

7. A system for downloading a resource in a mobile environment, the system comprising:
   a detector configured to detect a first attempt to access a first server and a second attempt to access a second server from a mobile terminal;
   an executor configured to execute a first thread for the first server and a second thread for a second server to which the attempt to access is made; and
   a downloader configured to download a resource of the first and second servers through the corresponding thread without a standby time by distributing resources of a network based on a multi-thread, and to unpack each of the resources that is compressed based on a file unit,
   wherein the detector is configured to detect the second attempt while the downloader downloads the resource from the first server through the first thread,
   wherein the first and second threads are executed in parallel in the order of servers to which the attempt to access is made, and wherein each of the first attempt and the second attempt is performed by a user of the mobile terminal at a time different from one another.

8. The system of claim 7, wherein the downloader is further configured to:
receive the compressed resource in response to a request to the corresponding server for the resource based on the corresponding thread; and
download the compressed resource.

9. The system of claim 8, wherein the downloader is further configured to unpack the compressed resource and record the unpacked resource in a storage device upon completing the download of the compressed resource.

10. The system of claim 8, wherein the downloader is further configured to download resources executed in each thread at different rates such that a thread completed with the download is entered into an idle state.

11. The system of claim 8, further comprising:
an uploader configured to compress the resource based on the file unit, and uploading the compressed resource to a corresponding server.

* * * * *